United States Patent Office 3,118,879
Patented Jan. 21, 1964

3,118,879
3-SUBSTITUTED AMINOETHOXYANDROSTA-3,5-DIENES
John P. Dusza, Nanuet, Seymour Bernstein, New City, and Marvin J. Fahrenbach, Tomkins Cove, N.Y., assignors to American Cyanamid Company, Stamford, Conn., a corporation of Maine
No Drawing. Filed Nov. 6, 1962, Ser. No. 235,832
14 Claims. (Cl. 260—239.5)

This invention relates to new steroid compounds. More particularly, it relates to 3-substituted androsta-3,5-dienes and methods of preparing the same.

The novel steroids of the present invention can be illustrated by the following structural formula:

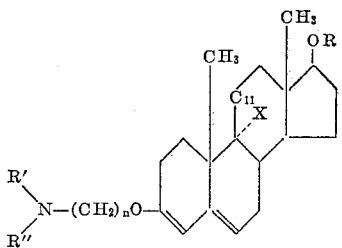

in which R is hydrogen or lower alkanoyl; R' and R" are lower alkyl; and

is a heterocyclic radical containing (1) carbon and nitrogen atoms or (2) carbon, nitrogen and oxygen atoms; X is hydrogen or a halogen atom; $C_{11}$ is a radical of the group

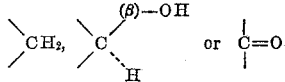

and $n$ is an integer from 2 to 4.

The present compounds are prepared by using as starting materials, steroids described in the prior art such as testosterone acetate, 17β-acetoxyandrost-4-ene-3,11-dione,
17β-acetoxy-11β-hydroxyandrost-4-en-3-one,
17β-propionyloxy-9α-fluoro-androst-4-en-3,11-dione,
17β-acetoxy-9α-fluoro-11β-hydroxyandrost-4-en-3-one,
17β - propionyloxy-9α-chloro-11β-hydroxyandrost-4-en-3-one,
17β-acetoxy-9α-bromo - 11β - hydroxyandrost-4-en-3-one and the like. These starting materials are reacted with a trilower alkylorthoformate preferably in the presence of a solvent such as, for example, dioxane, or an absolute alcohol and in the presence of a strong acid such as perchloric acid. The corresponding lower alkyl enolether of the androst-4-ene-3-one is obtained in each instance.

The steroid intermediates prepared immediately above are reacted with an alkylene chlorohydrin such as ethylenechlorohydrin, propylenechlorohydrin or butylenechlorohydrin to produce the corresponding 3(β-chloroethoxy)-3,5-androstadiene, 3(γ-chloropropoxy)-3,5-androstadiene and 3(δ-chlorobutoxy)-3,5-androstadiene, respectively. The reaction takes place readily at room temperature. The resulting product is generally crystalline and can be recovered and purified by methods well known to those skilled in the art.

The ω-chloroalkyleneoxy-3,5-androstadiens described above are reacted with secondary amines which replaces the chloro group with the corresponding amine group. Among the amines found useful in the process of the present invention are, for example, dimethylamine, diethylamine, dipropylamine, diisopropylamine, dibutylamine, diisobutylamine, methylethylamine, methylpropylamine, methylbutylamine, ethylpropylamine, ethylbutylamine, propylbutylamine, pyrrolidine, dibenzylamine, piperidine, morpholine, hexamethyleneimine and the like. The products resulting from the reaction which are the novel products of the present invention are illustrated in the examples hereinafter. The process is carried out preferably in a solvent such as acetone, when the amine boils at a temperature below 85° C., by heating the reactants in a closed vessel for from 5 to 24 hours. When the amines boil at temperatures above 85° C., an excess of the amine acts as a solvent as well as reactant. The purified amino products can be obtained by the usual method of purification.

The process to prepare the compounds of the present invention can be illustrated by the following flowsheet.

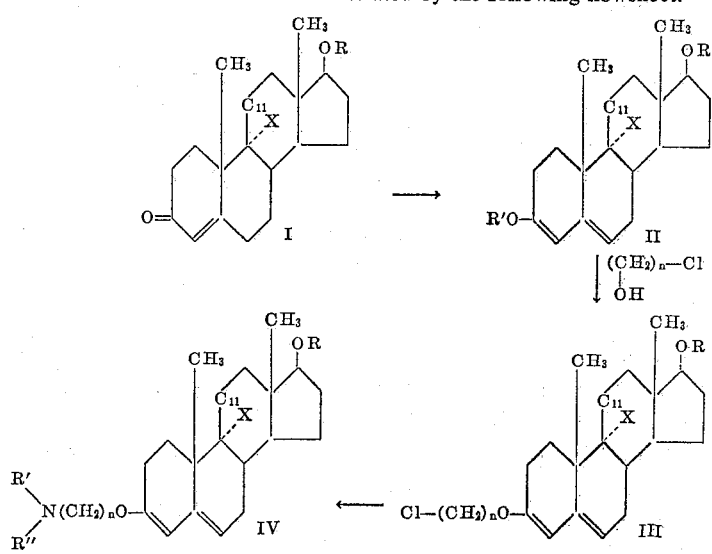

wherein R is hydrogen or lower alkanoyl; R' and R" are lower alkyl; and

is a heterocyclic radical containing (1) carbon and nitrogen atoms or (2) carbon, nitrogen and oxygen atoms; X is hydrogen or a halogen atom; $C_{11}$ is a radical of the group

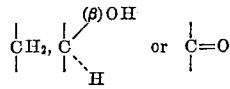

and $n$ is an integer from 2 to 4.

The compounds of the present invention have been found to have anti-cholesteremic activity. This activity in rats is indicative of usefulness in the treatment of hypercholesteremia.

The following examples illustrate the preparation of representative 3-substituted androsta-3,5-dienes of the invention.

*Example 1.—Preparation of 17β-Acetoxy-3-Methoxy-3,5-Androstadiene*

Testosterone acetate, 10.0 g., is suspended in a solution of 50 ml. of dioxane, 5.0 ml. of trimethylorthoformate and 0.5 ml. of absolute methanol. Four drops of 72% perchloric acid are added to the reaction mixture. After five minutes 1.0 ml. of pyridine is added and the solution with suspended pyridinium salt is poured into water and filtered giving 10.35 g. of the enol ether, melting point 160–165° C. Crystallization of a portion of this material from methanol in which it is considerably soluble raises the melting point to 176–180° C.

Following the procedure described above and substituting the following compounds in place of testosterone acetate, in each instance the desired enol ether is obtained.

17β-acetoxyandrost-4-ene-3,11-dione
17β-acetoxy-11β-hydroxyandrost-4-en-3-one
17β-acetoxy-9α-fluoroandrost-4-ene-3,11-dione
17β-acetoxy-9α-fluoro-11β-hydroxyandrost-4-en-3-one.

*Example 2.—Preparation of 17β-Acetoxy-3(β-Chloroethoxy)-3,5-Androstadiene*

To 17β-acetoxy-3-methoxy-3,5-androstadiene (1.0 g.) is added commercial ethylenechlorohydrin (10 ml.) and after standing 5 minutes at room temperature the now dark homogenous solution is treated with pyridine (4 drops) and diluted with methylene chloride (50 ml.). This solution is pased through a short column of a synthetic magnesium silicate followed by an additional amount of methylene chloride (200 ml.). The effluent is evaporated to dryness to give a crystalline residue which is crystallized from methanol to give the β-chloroethoxy enol ether, melting point 130–132° C.

Following the procedure of the above example and substituting the following compounds in place of 17β-acetoxy-3-methoxyandrosta-3,5-diene, in each instance, the desired β-chloro enol ether is obtained.

17β-acetoxy-3-methoxyandrosta-3,5-dien-11-one
17β-acetoxy-11β-hydroxy-3-methoxyandrosta-3,5-diene
17β-acetoxy-9α-fluoro-3-methoxyandrosta-3,5-diene-11-one
17β-acetoxy-9α-fluoro-11β-hydroxy-3-methoxyandrosta-3,5-diene.

*Example 3.—Preparation of 17β-Acetoxy-3(β-Secondary-aminoethoxy)-Androsta-3,5-Dienes*

A sample of 17β-acetoxy-3(β-chloroethoxy)-androsta-3,5-diene (0.5 g.) is dissolved in acetone (25 ml.) and one equivalent of sodium iodide is added. To the above mixture in a pressure flask is added a secondary amine (at least equivalent but normally more than five) and this is heated at 85° C. for 24 hours. The reaction mixture is then filtered, evaporated to dryness and dissolved in methylene chloride. Passage of this solution through a short magnesium silicate column and subsequent evaporation of the solvent gives the desired β-aminoethoxy compounds.

For amines boiling above 85°, the use of the pressure flask and acetone solvent is not required since the β-chloroethoxy compound is refluxed with the desired amine to give the corresponding β-aminoethoxy compound.

In the manner of the above example and substituting the following compounds in place of 17β-acetoxy-3(β-chloroethoxy)-androsta-3,5-diene, in each instance, the β-aminoethoxy compound is obtained.

17β-acetoxy-3(β-chloroethoxy)-androsta-3,5-dien-11-one
17β-acetoxy-3(β-chloroethoxy)-11-hydroxyandrosta-3,5-diene
17β-acetoxy-3(β-chloroethoxy)-9α-fluoroandrosta-3,5-dien-11-one
17β-acetoxy-3(β-chloroethoxy)-9α-fluoro-11β-hydroxyandrosta-3,5-diene.

Following the procedure described in the present example and using the amines: dimethylamine, diethylamine, dipropylamine, diisopropylamine, dibutylamine, diisobutylamine; pyrrolidine, dibenzylamine, piperidine, morpholine the following compounds are obtained.

17β-acetoxy-3(β-dimethylaminoethoxy)-androsta-3,5-diene;
17β-acetoxy-3(β-diethylaminoethoxy)-androsta-3,5-diene;
17β-acetoxy-3(β-diisopropylaminoethoxy)-androsta-3,5-diene;
17β-acetoxy-3(β-dipropylaminoethoxy)-androsta-3,5-diene;
17β-acetoxy-3(β-dibutylaminoethoxy)-androsta-3,5-diene;
17β-acetoxy-3(β-diisobutylaminoethoxy)-androsta-3,5-diene;
17β-acetoxy-3(β-pyrrolidinoethoxy)-androsta-3,5-diene;
17β-acetoxy-3(β-dibenzylaminoethoxy)-androsta-3,5-diene;
17β-acetoxy-3(β-piperidinoethoxy)-androsta-3,5-diene;
17β-acetoxy-3(β-morpholinoethoxy)-androsta-3,5-diene;
17β-acetoxy-3(β-dimethylaminoethoxy)-9α-fluoro-11β-hydroxyandrosta-3,5-diene;
17β-acetoxy-3(β-diethylaminoethoxy)-9α-fluoro-11β-hydroxyandrosta-3,5-diene;
17β-acetoxy-3(β-diisopropylaminoethoxy)-9α-fluoro-11β-hydroxyandrosta-3,5-diene;
17β-acetoxy-3(β-dipropylaminoethoxy)-9α-fluoro-11β-hydroxyandrosta-3,5-diene;
17β-acetoxy-3(β-dibutylaminoethoxy)-9α-fluoro-11β-hydroxyandrosta-3,5-diene;
17β-acetoxy-3(β-diisobutylaminoethoxy)-9α-fluoro-11β-hydroxyandrosta-3,5-diene;
17β-acetoxy-3(β-pyrrolidinoethoxy)-9α-fluoro-11β-hydroxyandrosta-3,5-diene;
17β-acetoxy-3(β-dibenzylaminoethoxy)-9α-fluoro-11β-hydroxyandrosta-3,5-diene;
17β-acetoxy-3(β-piperidinoethoxy)-9α-fluoro-11β-hydroxyandrosta-3,5-diene;
17β-acetoxy-3(β-morpholinoethoxy)-9α-fluoro-11β-hydroxyandrosta-3,5-diene;
17β-acetoxy-3(β-dimethylaminoethoxy)-11β-hydroxyandrosta-3,5-diene;
17β-acetoxy-3(β-diethylaminoethoxy)-11β-hydroxyandrosta-3,5-diene;
17β-acetoxy-3(β-diisopropylaminoethoxy)-11β-hydroxyandrosta-3,5-diene;
17β-acetoxy-3(β-dipropylaminoethoxy)-11β-hydroxyandrosta-3,5-diene;
17β-acetoxy-3(β-dibutylaminoethoxy)-11β-hydroxyandrosta-3,5-diene;
17β-acetoxy-3(β-diisobutylaminoethoxy)-11β-hydroxyandrosta-3,5-diene;
17β-acetoxy-3(β-pyrrolidinoethoxy)-11β-hydroxyandrosta-3,5-diene;

17β-acetoxy-3(β-dibenzylaminoethoxy)-11β-hydroxy-androsta-3,5-diene;
17β-acetoxy-3(β-piperidinoethoxy)-11β-hydroxyandrosta-3,5-diene;
17β-acetoxy-3(β-morpholinoethoxy)-11β-hydroxyandrosta-3,5-diene;
17β-acetoxy-3(β-dimethylaminoethoxy)-9α-fluoroandrosta-3,5-dien-11-one;
17β-acetoxy-3(β-diethylaminoethoxy)-9α-fluoroandrosta-3,5-dien-11-one;
17β-acetoxy-3(β-diisopropylaminoethoxy)-9α-fluoroandrosta-3,5-dien-11-one;
17β-acetoxy-3(β-dipropylaminoethoxy)-9α-fluoroandrosta-3,5-dien-11-one;
17β-acetoxy-3(β-dibutylaminoethoxy)-9α-fluoroandrosta-3,5-dien-11-one;
17β-acetoxy-3(β-diisobutylaminoethoxy)-9α-fluoroandrosta-3,5-dien-11-one;
17β-acetoxy-3(β-pyrrolidinoethoxy)-9α-fluoroandrosta-3,5-dien-11-one;
17β-acetoxy-3(β-dibenzylaminoethoxy)-9α-fluoroandrosta-3,5-dien-11-one;
17β-acetoxy-3(β-piperidinoethoxy)-9α-fluoroandrosta-3,5-dien-11-one;
17β-acetoxy-3(β-morpholinoethoxy)-9α-fluoroandrosta-3,5-dien-11-one;
17β-acetoxy-3(β-dimethylaminoethoxy)-androsta-3,5-dien-11-one;
17β-acetoxy-3(β-diethylaminoethoxy)-androsta-3,5-dien-11-one;
17β-acetoxy-3(β-diisopropylaminoethoxy)-androsta-3,5-dien-11-one;
17β-acetoxy-3(β-dipropylaminoethoxy)-androsta-3,5-dien-11-one;
17β-acetoxy-3(β-dibutylaminoethoxy)-androsta-3,5-dien-11-one;
17β-acetoxy-3(β-diisobutylaminoethoxy)-androsta-3,5-dien-11-one;
17β-acetoxy-3(β-pyrrolidinoethoxy)-androsta-3,5-dien-11-one;
17β-acetoxy-3(β-dibenzylaminoethoxy)-androsta-3,5-dien-11-one;
17β-acetoxy-3(β-piperidinoethoxy)-androsta-3,5-dien-11-one and
17β-acetoxy-3(β-morpholinoethoxy)-androsta-3,5-dien-11-one.

We claim:
1. A compound of the formula:

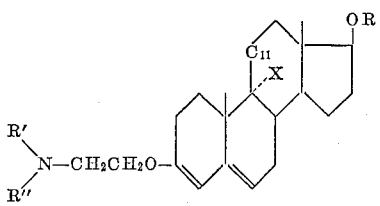

wherein R is a lower alkanoyl radical, $C_{11}$ is selected from the group

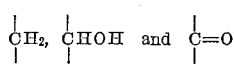

X is selected from the group consisting of hydrogen and a fluorine atom, R' and R" are lower alkyl radicals and

is selected from the group consisting of pyrrolidino, piperidino and morpholino.

2. A compound of the formula:

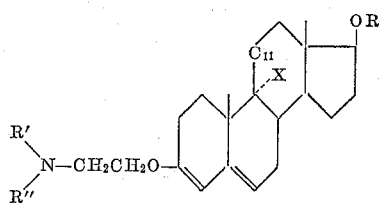

wherein R is a lower alkanoyl radical, $C_{11}$ is selected from the group

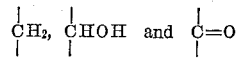

X is selected from the group consisting of hydrogen and a fluorine atom and

is selected from the group consisting of pyrrolidino and piperidino radicals.

3. A compound of the formula:

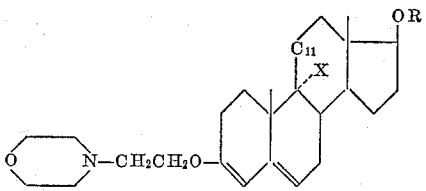

wherein R is a lower alkanoyl radical, $C_{11}$ is selected from the group

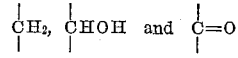

and X is selected from the group consisting of hydrogen and a fluorine atom.

4. 17β - acetoxy - 3(β - morpholinoethoxy) - androsta-3,5-diene.
5. 17β - acetoxy - 3(β - diethylaminoethoxy) - androsta-3,5-diene.
6. 17β - acetoxy - 3(β - piperidinoethoxy) - androsta-3,5-diene.
7. 17β - acetoxy - 3(β - diethylaminoethoxy) - 9α - fluoro-11β-hydroxyandrosta-3,5-diene.
8. 17β - acetoxy - 3(β - diethylaminoethoxy) - 11β-hydroxyandrosta-3,5-diene.
9. 17β - acetoxy - 3(β - morpholinoethoxy) - 9α - fluoroandrosta-3,5-dien-11-one.
10. 17β - acetoxy - 3(β - diethylaminoethoxy) - 9α-fluoroandrosta-3,5-dien-11-one.
11. 17β - acetoxy - 3(β-piperidinoethoxy) - 9α - fluoro-11β-hydroxyandrosta-3,5-diene.
12. 17β - acetoxy - 3(β - morpholinoethoxy) - 9α - fluoro-11β-hydroxyandrosta-3,5-diene.
13. 17β - acetoxy - 3(β - pyrrolidinoethoxy) - 11β - hydroxyandrosta-3,5-diene.
14. 17β - acetoxy - 3(β - pyrrolidinoethoxy) - 9α - fluoro-11β-hydroxyandrosta-3,5-diene.

References Cited in the file of this patent
UNITED STATES PATENTS
3,019,241    Ercoli _____ Jan. 30, 1962